May 6, 1958   C. J. SCRANTON   2,833,288
COMBINE HAVING REMOVABLE CONCAVE
Filed Dec. 2, 1953   2 Sheets-Sheet 1
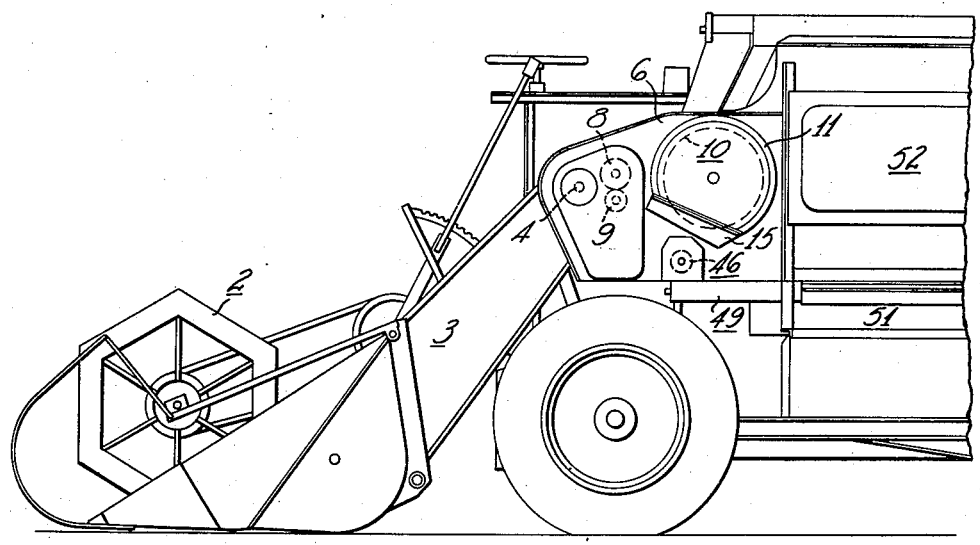
Fig. 1
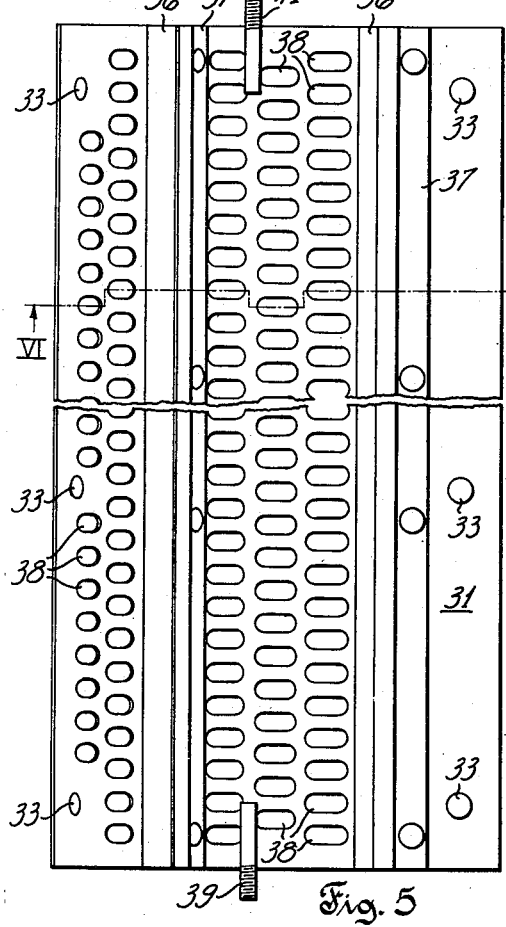
Fig. 5
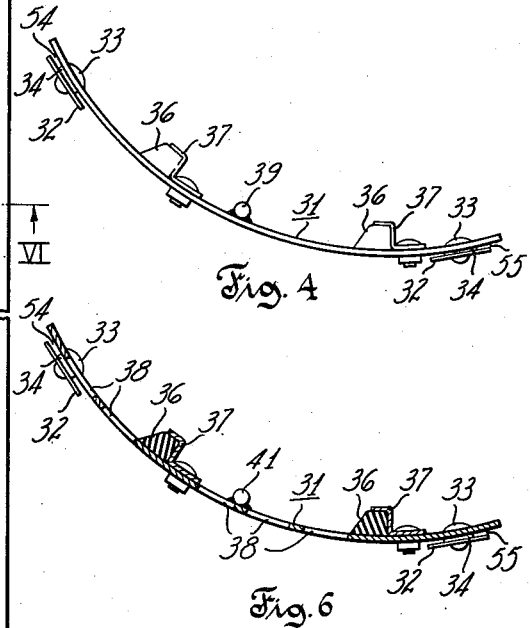
Fig. 4
Fig. 6
Inventor
Charles J. Scranton
by Bennett Tuckie
Attorney

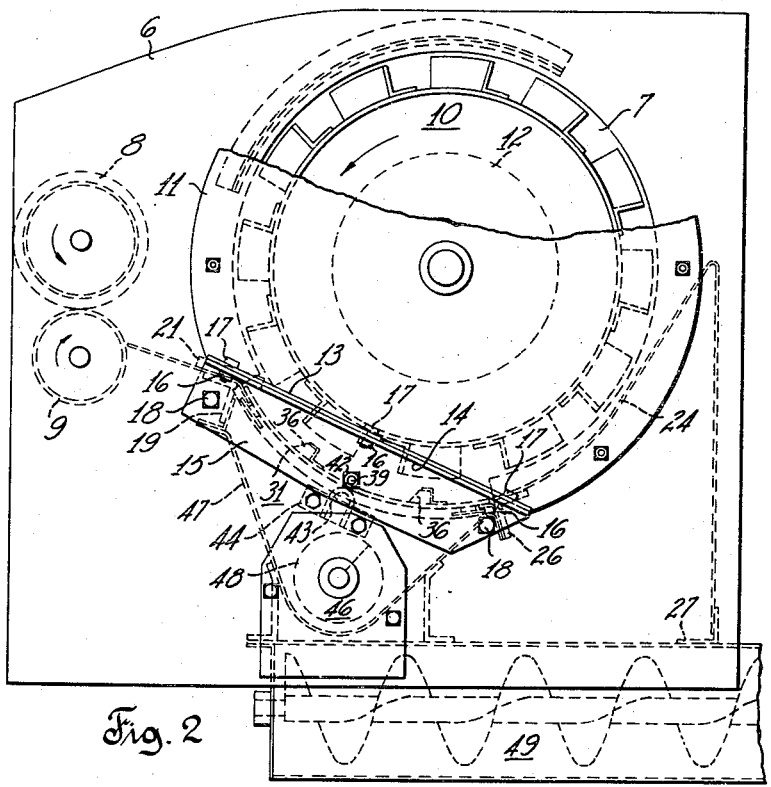

United States Patent Office 2,833,288
Patented May 6, 1958

2,833,288

COMBINE HAVING REMOVABLE CONCAVE

Charles J. Scranton, La Porte, Ind., assignor to Allis-Chalmers Manufacturing Company, Milwaukee, Wis.

Application December 2, 1953, Serial No. 395,769

3 Claims. (Cl. 130—27)

The present invention relates to harvesting machines and more particularly to combine harvesters having a threshing cylinder disposed between side walls and a concave plate coacting with the cylinder for the purpose of threshing grain from the straw.

The principal object of the invention is the provision of a novel and improved mounting of a concave plate and associated parts in the thresher housing of a combine harvester, the improved mounting permitting ready removal of the concave plate through an opening in a side wall without removing the threshing cylinder and with a minimum of labor.

In combine harvesters provisions have heretofore been made for removing the threshing cylinder through a side opening of the thresher housing, and for removing the concave plate through the same side opening after the necessary space has been cleared by removal of the threshing cylinder. Removal of the concave plate in accordance with this heretofore known procedure involves a considerable amount of time and labor, and for that reason the mentioned provisions for removing the concave plate as heretofore made have not been entirely satisfactory, not only with respect to the servicing of the machine but also with respect to its general utility.

For efficient harvesting of crops it is imperative that the correct concave plate for the crop be used. For example, in threshing wheat a concave plate is used having holes therein of a desired size so that some separation of grain and straw is accomplished during the threshing process. If another crop, such as clover is then to be harvested, for which a concave plate without holes is desirable, it is necessary for efficient harvesting to substitute a blank concave plate for the one having holes, and if beans are to be harvested, a concave plate having holes therein larger than those used for wheat is desirable. And again, concave plates may become damaged and require replacement.

More specifically, it is an object of the present invention to provide an improved combine harvester which may be selectively equipped with different types of concave, and wherein a change from one type of concave to another may be effected expeditiously and conveniently by one man and without special tools.

A further object of the invention is to provide an improved combine harvester of the hereinabove outlined character incorporating a mounting arrangement for the concave which permits convenient manipulation of the concave as a unit into and out of an installed position in cooperative relation to the threshing cylinder; which is simple and adequately strong to withstand the considerable loads to which the concave is subjected in operation; and which involves no materially higher manufacturing costs than the hereinabove mentioned removable concave mounting of the prior art.

These and other objects and advantages of this invention will be apparent after a consideration of the following description, in which reference is had to the drawings appended hereto, in which:

Fig. 1 is a side elevation view of a forward portion of a self-propelled combine harvester embodying the invention;

Fig. 2 is an enlarged view of a portion of the machine shown in Fig. 1;

Fig. 3 is a view similar to Fig. 2 with a portion removed;

Fig. 4 is an enlarged side elevation view of the concave plate assembly;

Fig. 5 is an enlarged plan view of the concave plate assembly; and

Fig. 6 is a view taken on line VI—VI of Fig. 5.

Referring to Fig. 1, it is seen that a combine harvester has been provided, the front end only of which is shown, including a header structure equipped with rotatable reel 2 and a grain cutting and conveying mechanism indicated generally at 3. The header is pivotally mounted about an upper conveyer shaft 4 for up and down swinging movement. Conveyor shaft 4 is journaled in bearings carried by longitudinally extending vertical side walls 6 and 7 of the thresher housing (Fig. 2). Adjacent to and rearwardly of shaft 4, a pair of coacting feed rolls 8 and 9 are journaled in longitudinally extending side walls 6 and 7 in receiving relation to cut grain delivered from the conveyer mounted about shaft 4. A pair of generally circular side plates 11 and 12 are removably attached to side walls 6 and 7, respectively, generally in covering relation to openings in such side walls. A transversely extending threshing cylinder 10 is rotatably mounted in bearings (not shown) which are attached to side plates 11 and 12. The normal direction of rotation of cylinder 10 is shown by arrows in Figs. 2 and 3. The lower portion of side plate 11 is provided with an outwardly turned flange portion 13 which is joined to an outwardly turned flange portion 14 of a removable concave cover plate 15 by means of nuts 16 and bolts 17 (Fig. 2). Cover plate 15 is also attached to side wall 6 by means of bolts 18.

A transversely extending angle bar 19 is attached at its ends to side walls 6 and 7 and has attached thereto a ledger plate 21 and a roll stripper plate 22 having its forward end positioned adjacent lower feed roll 9 and having its rearward end, indicated at 23, extending downwardly away from ledger plate 21. A concave plate extension 24 is supported on a pair of transversely extending angle members 26 and 27. Also attached to angle member 26 is an angle element 28 which extends between side walls 6 and 7 and is provided with a forwardly extending end portion 29.

The angle bar 19 and associated roll stripper plate 22, and the angle member 26 and associated angle element 28 form a pair of relatively spaced cross members fixedly mounted within the thresher housing in underlying, adjacent relation to the threshing cylinder 10 so as to extend axially of the latter in proximity to the front and rear ends, respectively, of an elongated aperture 53 (Fig. 3) in the side wall 6 of the thresher housing. The elongated aperture 53 extends in the direction of its length along a lower peripheral portion of the threshing cylinder 10 and, as best shown in Fig. 3, the aperture 53 has a bottom edge between its front and rear ends in downwardly offset relation to the cylinder 10.

A concave plate or element 31 is supported at its forward end on the rearward end or tongue 23 of stripper plate 22 and at its rearward end on the forwardly extending portion or tongue 29 of angle element 28. Concave plate 31 is provided along its forward and rearward ends with a series of guiding elements including washers 32 (Figs. 4, 5 and 6) riveted or otherwise fastened to plate 31 in spaced relation thereto by means of rivets 33 or the like and spacer element 34 positioned around the shanks of rivets 33 between washers 32 and concave plate 31. If desired, rivets with enlarged shanks can be used and spacer members 34 eliminated. Concave plate 31 is also provided with transversely extending face strips 36 which are preferably made of rubber and which are attached to concave plate 31 as by means of retainers 37 which are attached to concave plate 31 as by means of bolts and nuts. Concave plate 31 is illustrated as being provided with several series of holes 38 therethrough for permitting separation of grain from the straw while the same is being threshed. The size of holes 38 depends on the particular crop being handled and in some instances, it is even desirable to have a blank concave plate (that is one that has no grain discharge holes in it).

Attached to opposite upper transverse end portions of concave plate 31 are threaded pins 39 and 41. Pin 39 extends through an aperture in concave cover member 15. A nut 42 can be engaged with the threaded end of pin 39 (Fig. 2) and tightened up to clamp concave plate 31 against cover member 15. Pin 41 extends through an aperture (not shown) in side wall 7 and can be engaged with a nut to tighten concave plate 31 against side wall 7 in the same manner as has been described for pin 39. An inverted U-shaped member 43 extends between side walls 6 and 7 in contiguous underlying relation to concave plate 31 adjacent pins 39 and 41. The transverse end portions of U-member 43 are attached to plates 44 which in turn are attached to side walls 6 and 7 as by bolts and nuts.

Underlying concave plate 31 and extending between side walls 6 and 7 is a transverse auger assembly 46 including a trough like guide 47 attached at its ends to angle members 19 and 26 and having a transversely extending auger conveyer 48 operatively mounted in the lower portion of the trough for moving grain dropping through the apertures 38 in concave plate 31 transversely to a point of discharge into longitudinally extending auger conveyer 49 which in turn delivers the grain to cleaning mechanism 51 (Fig. 1).

The operation of the harvester described so far is as follows: Grain is cut and elevated to feed rolls 8 and 9 by cutting and conveying mechanism 3. Feed rolls 8 and 9 revolve in the directions shown in Fig. 2 and deliver the cut grain onto the roll stripper plate 22 and ledger plate 21 from where the cut grain is driven over the concave plate 31 by action of the threshing cylinder 10. During this passage the grain heads are impelled by the cylinder against the face strips 36 and some of the grain is separated from the straw and drops through holes 38. This grain then goes down into trough 47 and is moved transversely by auger conveyer 48 to a point where the grain drops into longitudinal auger conveyer 49 which delivers the grain to a cleaning mechanism 51, from whence it is handled in a conventional manner.

The straw containing grain which did not pass through the holes in the concave plate 31 is impelled over the upper end of concave extension 24 into a straw rack compartment 52 where the grain is separated from the straw and the grain is directed to cleaning mechanism 51. The power means for activating the various mechanisms previously described are not herein recited nor shown as any conventional means can be used for driving these mechanisms.

Assume that the operator of the harvester wishes to change concave plates in the harvester described. The operator may wish to do this for any one of several reasons such as: The concave plate may have openings too large or too small for the crop he wishes to harvest or he may wish to insert a concave plate having no openings in it or the concave plate may have been damaged or become worn. All the operator has to do to change concave plates is to take the nut off of pin 41, take nuts 16 and bolts 17 out of contact with flange members 13 and 14, remove bolts 18 from cover member 15, and remove nut 42 from pin 39, then cover member 15 can be transversely moved away from side wall 6. Concave plate 31 can then be slid transversely out of the opening 53 and a new concave plate slid into position in place of concave plate 31. The steps above recited will then be performed in reverse to fasten the new concave plate in position.

Referring to Figs. 4 and 6 it is seen that the forward end of concave plate 31 is provided with a series of guiding grooves 54 formed by the end of concave plate 31, spacers 34 and washers 32. Received within these grooves 54 is the rearward end 23 of roll stripper plate 22. A similar series of grooves 55 is provided at the rearward end of plate 31 by spacers 34 and washers 32. Received within grooves 55 is the forward end 29 of angle iron 28.

Grooves 54 and 55 provide efficient guide means for plate 31 when it is being slid into or out of operative position below cylinder 10. These grooves 54 and 55 also prevent up or down movement of the ends of concave plate 31 relative to cylinder 10 while pins 39 and 41 and U-member 43 prevent up and down movement of the midlongitudinal portion of plate 31 relative to the threshing cylinder 10, and pins 39 and 41 coacting with the fastening means attached thereto and with side wall 7 and cover member 15 prevent transverse movement of concave plate 31 relative to cylinder 10.

It is to be understood that it is not desired to limit the invention to the particular features and details described hereinabove and that the invention is to be considered as including such other forms and modifications as are fairly within the scope of the appended claims.

It is claimed and desired to secure by Letters Patent:

1. In a harvesting machine having a transversely extending threshing cylinder rotatably supported between longitudinally extending side walls thereof and a concave element positioned between said side walls in coacting relation to said cylinder, the improvement comprising one of said side walls being provided with an opening registering with one of the laterally opposite ends of said concave element, a cover member attached to said one side wall in covering relation to said opening, fore and aft extensions of said concave carried by said side walls, the transversely extending opposite ends of said concave element being provided with a plurality of members attached thereto in spaced relation to form a series of registering grooves adjacent each of said transversely extending opposite ends in cooperative engagement with tongue portions of said fore and aft extensions for supporting said concave element, said concave element being provided with an outwardly extending part on each of said laterally opposite ends thereof projecting, respectively, through openings in said cover member and in the other of said side walls, and removable means coacting with said parts, cover member and other side wall for clamping said concave element between said side walls, said grooves and tongue portions being so constructed and arranged that when said removable means are removed from said parts and said cover member is removed from said one side wall said concave element is slidable transversely out of contact with said tongue portions and through said opening independently of said cylinder.

2. In a harvesting machine having a transversely extending threshing cylinder rotatably supported between transversely spaced longitudinal side walls thereof and a concave element positioned between said side walls in underlying coacting relation to said cylinder, the improvement comprising one of said side walls being provided with an opening registering with one of the laterally opposite ends of said concave element, a cover member attached to said one side wall in covering relation to said opening, fore and aft members forming extensions of said concave element and being carried by said side walls with the relatively opposed ends of said members positioned adjacent to and below the transversely extending opposite ends, respectively, of said concave in supporting relation thereto, a plurality of plate members attached to said transversely extending opposite ends of said concave element in underlying spaced relation thereto so as to form guides in transverse sliding engagement with said extensions, said concave element being provided with an outwardly extending part on each of said laterally opposite ends thereof projecting, respectively, through openings in said cover member and in the other of said side walls, removable means coacting with said parts, cover member and other side wall for clamping said concave element between said side walls, and an auxiliary support for said concave element carried by said side walls and positioned adjacent said parts in underlying relation to said concave element, said guides and auxiliary support being so constructed and arranged that when said removable means are removed from said parts and said cover member is removed from said one side wall said concave element is free to slide transversely out of the space between said side walls through said opening independently of said cylinder.

3. In a combine harvester, the combination of a thresher housing, a rotary threshing cylinder operatively mounted to extend axially between opposite side walls of said housing, one of said side walls having an elongated aperture extending in the direction of its length along a lower peripheral portion of said cylinder and having a bottom edge between its front and rear ends in downwardly offset relation to said cylinder, a unitary concave structure insertable into and withdrawable from said housing by endwise movement thereof through said aperture, a pair of relatively spaced cross members fixedly mounted within said housing in underlying, adjacent relation to said cylinder so as to extend axially of the latter in proximity to said front and rear ends, respectively, of said elongated aperture, and releasable connecting means operable to retain said concave structure within said housing in cooperative relation to said cylinder upon endwise inward movement of said concave structure through said aperture, said connecting means including complementary tongue and groove means presented by said concave structure and by portions of said cross members in overlapping relation to adjacent portions of said concave structure for guiding said concave structure during said endwise movement thereof axially of said cylinder.

References Cited in the file of this patent

UNITED STATES PATENTS

| | | |
|---|---|---|
| 717,226 | Liebich | Dec. 30, 1902 |
| 768,472 | Mack | Aug. 23, 1904 |
| 991,477 | Buchanan | May 9, 1911 |
| 1,286,831 | Sturtevant | Dec. 3, 1918 |

OTHER REFERENCES

"Machines for the Farm, Ranch, and Plantation" by Turner and Johnson, copyright 1948, page 497 relied on.